United States Patent [19]
DeLaMater et al.

[11] 3,870,739
[45] Mar. 11, 1975

[54] ISOCYANATES FROM URETHANES

[75] Inventors: George B. DeLaMater, Media;
Elbert C. Herrick, West Chester;
Barton Milligan, Ardmore, all of Pa.

[73] Assignee: Air Products and Chemicals Inc., Wayne, Pa.

[22] Filed: Mar. 5, 1973

[21] Appl. No.: 337,954

[52] U.S. Cl. ............................................. 260/453 P
[51] Int. Cl. ............................................. C07c 119/04
[58] Field of Search ................................. 260/453 P

[56] References Cited
UNITED STATES PATENTS
2,409,712    10/1946    Schweitzer ........................ 260/453

Primary Examiner—Lewis Gotts
Assistant Examiner—Dolph H. Torrence
Attorney, Agent, or Firm—Harold A. Hormann; Barry Moyerman

[57] ABSTRACT

Isocyanates are produced in high yield by noncatalytic short contact time pyrolysis of the corresponding urethane at temperatures in the range of 350°–550°C under conditions of controlled residence time and pressure, followed by two-stage condensation of the dissociation product vapors. The first stage is the rapid cooling of the product vapors to condense out the isocyanate product. The second stage effects cooling to the lower temperatures required to condense out the alcohol product of dissociation. Isocyanate yields in excess of 95 percent can be obtained by the thermal pyrolysis.

5 Claims, 1 Drawing Figure

PATENTED MAR 11 1975 3,870,739
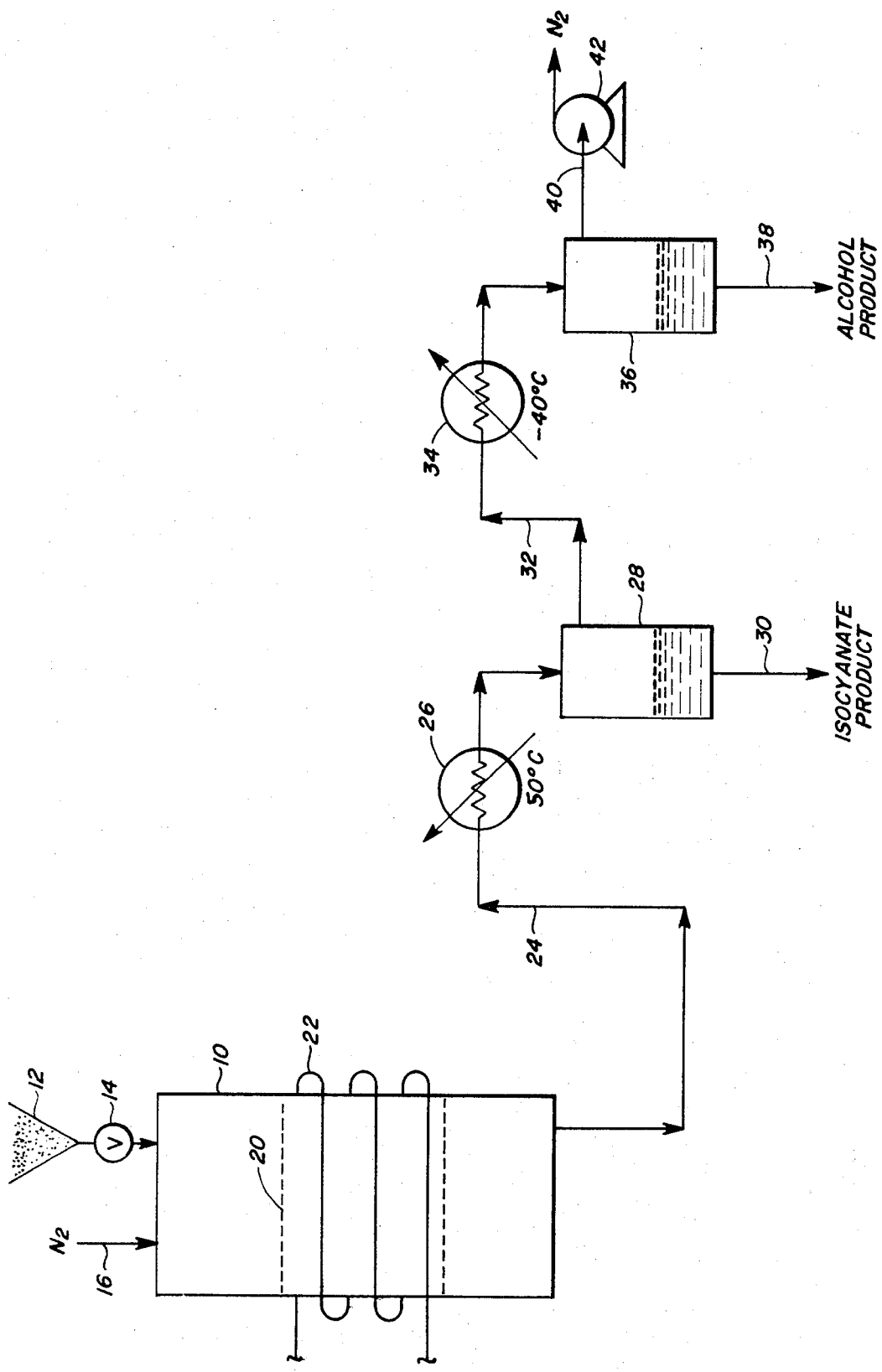

ISOCYANATES FROM URETHANES

FIELD OF THE INVENTION

The present invention relates to the thermal dissociation of urethanes to produce isocyanates.

BACKGROUND OF THE INVENTION

Organic isocyanates, particularly aromatic isocyanates, are produced and consumed in great quantitites. In particular, a substantial demand exists for the tolylene diisocyanates (TDI). Interest exists also in the mono and di-isocyanates of xylenes and benzene. However, despite the large scale useage of TDI and the considerable efforts by workers in the art, a relatively inexpensive procedure which might serve for the commercial technique of preparing these isocyanates has not been provided heretofore.

OBJECT OF THE INVENTION

It is the object of this invention to provide a method to prepare the mono and di-isocyantes of benzene, toluene and xylene through non-catalytic, short contact time thermal dissociation of the urethane precursors thereof.

Studies on thermal dissociation of substituted urethanes have shown that several types of reactions may occur:

1. dissociation to isocyanate and alcohol

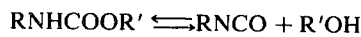
RNHCOOR' ⇌ RNCO + R'OH 2. formation of primary amine and olefin

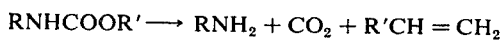
RNHCOOR' → RNH₂ + CO₂ + R'CH = CH₂

3. formation of secondary amine

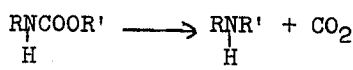

It has now been discovered that the aromatic hydrocarbon urethanes of methanol, ethanol, n-prepanol and n-butanol can be thermally dissociated into isocyanate and alcohol under conditions which suppress amine producing side reactions and which suppress, also, reversal of the dissociation reaction. Isocyanate yields in excess of 96 percent of theory can be obtained, with a purity level in excess of about 95 percent.

Statement of the Invention

Briefly stated, the procedure of the present invention involves pyrolyzing an appropriate urethane non-catalytically at a temperature in the range of between about 350° to 550°C, at a residence time in the reaction zone equivalent to 1 to 200 grams of urethane per minute per liter of reactor free volume capacity (g/m/l), preferably 10 to 50 g/m/l in a packed reactor, and at pressure no higher than established by the formula ($m$ + 1) $x$ vapor pressure of the product isocyanate at the prevailing reactor temperature, where $m$ is the number of urethane groups per molecule.

DESCRIPTION OF THE INVENTION

Thermal dissociation of urethanes has been suggested to the art, as witness for example, the catalytic procedures taught in British Pat. No. 1,247,451. However, the isocyanate yield and purity in the pyrolysis product from such procedures are so poor that, in a practical sense, the prior art techniques seem to be non-feasible.

The context of the present invention revolves around the commercial desirability for a high yield, high purity isocyanate product. Desired are yields in excess of 95 percent, purity in excess of 95 percent. Such considerations render the intrinsic thermal stability of the reaction products significant toward achieving the desired avoidance of side reactions, such as for example amine formation. Practice of this invention therefore contemplates thermal pyrolysis of urethanes having the following formula:

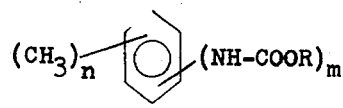

where $n$ is an integer from 0 to 2
where $m$ is an integer from 1 to 3
where R is a hydrocarbon radical selected from the group consisting of methyl, ethyl, n-propyl, and n-butyl.

The above urethane group contemplates the methyl, ethyl, n-propyl and n-butyl mono and bisurethanes of benzene, toluene and xylene. The isocyanate products involved are, of course, the benzene, toluene and xylene mono- and di-isocyanates. The toluene di-isocyanates (TDI) are in great commercial demand.

Thermal pyrolysis of the above-identified urethanes in accordance with the invention produces virtually quantitative yields of the isocyanate and alcohol, particularly, it has been found, when pyrolysis is effected non-catalytically with short contact time residence of the reaction products in the pyrolysis zone. The importance of residence time cannot be minimized; the shorter the better. The residence period of the dissociation products (which under reaction conditions are in vapor phase) should be less than about 15 seconds, preferably less than about 1 second. About 0.1 second, if achievable in commercial practice, would be desirable. In this connection, an expedient, which has been found useful in many short contact time reactions, of employing an inert gas sweep, nitrogen for example, to help take off the reaction products from the pyrolysis zone with the shortest feasible contact time while having merit under some circumstances is preferably avoided since it tends to interfere with the condensation and recovery of the alcohol product. Laboratory scale studies have not proven that presence of a sweep gas improves yield or purity, but large commercial size reactors may benefit from use of an inert sweep gas for efficient operation. In addition, use of a sweep gas offers possibilities for employing the sweep gas as an aid in feeding the urethane into the pyrolysis zone reactor e.g. suspending the urethane therein; and also as a source of heat for the endothermic reaction.

Allusion has already been made to the 350°C – 550°C temperature range found suitable for the thermal dissociation reaction. Preferably the pyrolysis temperature is not in excess of about 530°C. An interrelationship exists however between contact time and temperature, wherein shorter contact times are required (to avoid side reactions) at the higher temperatures.

The non-catalytic nature of the thermal dissociation as carried out according to practice of this invention is most advantageous, if only through its avoidance of catalyst expense. Avoided also are all the problems associated with a catalytic procedure, including notably possible carryover of catalyst into the isocyanate reaction product and catalyzation there of side reactions. Desirably the pyrolysis is effected in the presence of thermally and dimensionally stable non-catalytic solids, including for example quartz particles, metal packing, etc. The nature of the inert solids is not material. No differences have been observed with diverse solids, including for example, ceramics like quartz and different metals like stainless steel and copper. Presence of the non-catalytic solids offer many process advantages. They can be heated, e.g. electrically, to closely controlled temperatures, and through action as a heat sink maintain uniform and proper reaction temperature conditions.

Heat supply and temperature control along with time are quite critical to the successful operation of this invention. Critical factors include the heating of the urethane charge to dissociation temperature rapidly and with no appreciable delay or holding at an intermediate temperature level; the short time pyrolysis of the urethane to the isocyanate and alcohol products at the dissociation temperature which needs to be maintained by provision of additional heat to offset the endothermic nature of the dissociation reaction; and removal of the reaction products from the pyrolysis zone promptly for substantially immediate seriatum condensation of the isocyanate and alcohol products.

The best results have been obtained by introducing the urethane charge in solid form, e.g., powder, ribbon, strand, pellet, or similar form, directly into the pyrolysis zone maintained at the desired elevated temperature. It has been found that some preheating of the urethane charge is acceptable, e.g., for purposes of providing molten urethane permitting liquid feed to the pyrolysis zone, but only to the extent of having the urethane charge in such preheated state for no more than about 30 seconds prior to introduction to the pyrolysis zone. Having the urethane charge at temperature intermediate ambient and pyrolysis for longer times is detrimental to desired results and probably is due to undetermined but evident change in the nature of the urethane charge. The preferred practice therefore is to introduce the urethane charge at about ambient temperature and as a solid directly to the pyrolysis zone.

It is evident that means of providing heat along with temperature control are required in connection with the pyrolysis zone in order that the urethane charge can be raised promptly to reaction temperature. Additional heat supply is required in that the dissociation reaction is endothermic. Towards the maintenance of uniformity of the desired and required temperatures the presence of suitable inert packing, as mentioned previously, with appreciable heat capacity serves as a heat sink in the pyrolysis zone and thus lessens the tendency toward undesirable temperature fluctuations in the reaction one where a measure of temperature constancy is highly desirable.

Of appreciable criticality to the successful operation of this invention is the retrieval of the desired products which unless captured promptly will quickly degrade, react further, revert to the urethane precursor or otherwise assume form and condition adverse to the desired high yield and purity of product obtainable through practice of this invention. To the desired end therefore the reaction products from the pyrolysis zone are subjected to immediate cooling in a condensing system adjusted to provide rapid chilling of the product stream to obtain as condensate from a first condensing stage substantially all and preferalby substantially only the isocyanate component of the product stream. In a subsequent condensing stage at substantially lower temperature or higher pressure the alcohol component may be condensed. Recovery of the separately condensed product is effected by an available practical method.

Acceptable operating pressure conditions for the overall reaction and recovery system have considerable inherent flexibility in the range of 1 mm to 1,050 mm Hg although for highest yield and purity of products the preferred overall operating pressure is within the range of 4 to 105 mm Hg. However where engineering expedient or mechanical equipment considerations indicte desirability of operation at other pressure levels the lowest practical operating pressure may be 1 mm Hg.

It is to be understood that proper operating conditions in the reaction zone and the immediately subsequet condensation zone are the critical conditions upon which the success of this invention depend. The elements of the operating conditions are temperature, time and pressure. These elements have been defined above as temperature in the range of between about 350° to 550°C, time in terms of residence time on the basis of the dissociation products in vapor phase as being less than about 15 seconds, and pressure of less than $(m + 1)$ times the vapor pressure of the product isocyanate at the reaction zone temperature. Such pressure limiation permits operation at pressure substantially higher than practical because ancillary requirements in the physical components, e.g., reactor, would pass the bounds of common sense to meet the short residence time requirements. At 525°C, for instance, pressure in the order of about 140 atmospheres is theoretically possible; however reactor size would diminish to almost the point of no return.

Since the dissociation of the urethane is rapid and substantially complete at the given temperatures and within the times shown, the pressures acceptable in practical equipment are definitely in the lower range of the theoretical. In turn the pressure, as reflected into the primary condensation system, has its own definite effects and requirements. Thus, at a pressure of 105 mm Hg a condenser temperature no higher than 150°C is needed to obtain condensation of the isocyanate containing no more than 1 mole percent alcohol when the system is that of TDI and methanol. In the same component system, a condenser temperatures of 150°C but with a pressure of 1,050 mm Hg, the amount of methanol increases to 10 mole percent in the first stage condensate.

However, the point here is to recover the isocyanate in the product as completely as is resonably possible and as soon as possible after the reaction zone products emerge from the reaction zone. Thus a controlling factor is the selection of condensing conditions effecting this result. While condensing conditions can be adjusted to condense all of the rection products such operation is undesirable in that it would place the reactive products together and simply promote reversion to the urethane. To ensure a recoverable yield of at least 95 percent of the theoretical amount of the isocyanate in the effluent from the substantially complete dissociation of the urethane charge, the condensate in the first condenser stage should contain substantially all of the condensable isocyanate and no more than about 5 mole percent of the alcohol product. This requirement is met by operation of the first condenser stage under conditions within the range of an upper temperature of 150°C with an upper pressure when the alcohol is butanol of 105 mm Hg, when the alcohol is ethanol of 380 mm Hg and when the alcohol is methanol of 525 mm Hg provided that when either the temperature or pressure is lowered then either pressure or temperature is correspondingly reduced within the lower limit of 50°C with a maximum lower pressure limit of 20 mm Hg when the alcohol is methanol, or 11.5 mm Hg when the alcohol is ethanol or 2.5 mm Hg when the alcohol is butanol.

Thus, for a preferred system involving the dissociation of methanol-based urethane, the isocyanate product of about 99 percent purity is obtained when the condenser temperature of 50°C is employed in conjunction with a pressure of 4 mm Hg or the condenser temperature of 150°C is employed in conjunction with a pressure of 105 mm Hg or less. A desired level of product isocyanate purity for all practical purposes is thus made possible by appropriate selection of the proper combination of temperature and pressue conditions in the first condensation stage.

Important to the detailed practice of the present invention is employment of a two-stage vapor condensation arrangement through which the vapor phase dissociation reaction products pass sequentially. In the first condensation stage, the reaction products are rapidly cooled. Thus, the first condensation stage may be a conventional air or water cooled condenser. Under the low pressure condition of the reaction products, cooling the vapor phase dissociation reaction products to temperature levels in the range of 50°C to 150°C depending on the pressure is sufficient to condense the isocyanate out in liquid phase, with up to no more than about 5 percent of alcohol vapors condensed in the liquid phase. Accordingly, the first cooling and condensation stage can act to separate out a rather pure isocyanate product. The high relative voltility of methanol, ethanol or butanol makes for a clean separation into liquid isocyanate and alcohol vapor. It is established that prompt cooling of the hot reaction products of the thermal dissociation of the urethane and their separation into a liquid isocyanate phase and a vapor form alcohol phase serves largely to prevent reactions between the alcohol and the isocyanate co-products.

The second condenstion stage which serves to condense out the alcohol normally is operated at sub-zero temperatures in order to be adequate to the needs for recovering the alcohol content from the low absolute pressure gas flowing into and through the second condensation stage. For small scale or laboratory sie process equipment, an acetone dry-ice cooled condenser is satisfactory for recovering the alcohol. Alternatively, the residual alcohol vapor can be compressed and condensed at higher temperatures without the need for artificial refrigeration.

For further understanding of the present invention, reference is now made to the attached drawing wherein is shown a flow sheet diagrammatically illustrating the process of the present invention.

Powdered urethane in a feed hopper 12 flows through an air tight valve 14 e.g. a star valve, into an evacuated noncatalytic pyrolysis reactor 10. A nitrogen sweep gas feeds into reactor 10 from gas line 16. Use of the nitrogen sweep is optional. Once inside the reactor 10, the urethane is rapidly heated to a predetermined thermal dissociation reaction temperature, and then dissociated into isocyanate and alcohol under the evacuated conditions of below 100 mm Hg.

Mention has already been made that the urethane dissociation reaction carried out according to preferred practice of the present invention is a short contact time pyrolysis effected in the presence of hot non-catalytic contact surfaces. A suitable non-catalytic packing 20 e.g. stainless steel packing disposed inside reactor 10 heats the urethane to dissociation temperatures. In the flow sheet illustration of a preferred mode of the invention, packing 20 is electrically heated by an external electric heater coil 22 wrapped around the packed portion of reactor 10. Electrical heating internal or external is convenient, and quickly responsive to temperature control actuated by one or more thermocouples imbedded inside packing 20 (not shown). Since the dissociation reaction is non-catalytic, the material employed for packing 20 may of course be selected from among the many available temperature resistant gas-permeable packing materials known to the art. Exemplary packing materials which have been found suitable for practice of this invention are stainless steel, copper and quartz.

The hot gaseous reaction products are drawn off from reactor 10 by way of line 24 after the short residence period therein to water cooled condenser 26 wherein the isocyanate vapors are condensed to liquid phase. The alcohol co-product and, of course, any sweep gas remain in vapor phase virtually quantitatively. In the flow sheet illustrated in the drawing, consenser 26 cools the reaction products to about 50°C. From condenser 26 the now partially liquified thermal dissociation reaction products pass to separator 28 where the liquid isocyanate is collected for removal by way of line 30 as a product of the thermal dissociation process of the present invention.

The uncondensed vapors leaving gas-liquid separator 28 by way of line 32 pass to second stage condenser 34 wherein the reaction products are chilled to the low emperature levels, e.g. −40°C, required to liquify the sub-atmospheric pressure alcohol vapors. In passing it may be noted that practice of the present invention contemplates second stage condenser 34 under circumstances wherein the alcohol co-product may be frozen out from the vapors directly as a solid or ice phase; or operated in conjunction with suitable pressurization permitting somewhat higher condensation temperature. According to preferred practice condenser 34 condenses the alcohol reaction product to a liquid phase, and a separator 36 collects the alcohol as an additional product of the dissociation procedure of the present invention. The alcohol product is taken off from separator 36 by way of line 38, while the noncondensables and any inert sweep gas pass out of separator 36 through line 40. A suitable high capacity evacuating means, indicated for illustrative purposes as vacuum pump 42 draws gas out of separator 36 and eacuates the entire system.

The evacuating means 42 can serve initially to reduce the pressure inside the entire reaction train to the reaction operating level of less than 100 millimeters of mercury, preferably less than 50 mm Hg.

For further understanding of the present invention and to illustrate the preferred modes thereof, the following specific examples are presented. As is illustrated therein, the present non-catalytic thermal dissociation is effected quite efficiently with isocyanate yields and purity in excess of about 95 percent.

EXAMPLE I

An 8-inch deep bed of stainless steel packing (Heli-Pak) 0.05 × 0.1 × 0.1 in a glass tube 30 mm O.D. providing the equivalent of 97.5 ml free space, with the tube heated by an external wrapping of heating wire was employed for the pyrolysis zone. The packing was temperature controlled to maintain a temperature of 440°C as measured by a thermocouple placed 3.5 inches from the top of the bed. The glass tube reactor was evacuated to 10 mm Hg and a nitrogen flow of 10 ml (standard) per minute was passed through the reactor. The reactor was connected in sequence to an air-cooled condenser equipped with a gas-liquid trap to remove condensed liquid then to an acetone-dry ice cooled vapor trap.

Powder-form cold dimethyl tolylenedicarbamate (an 80/20 percent mixture of 2,4 and 2,6 isomers) was fed to the top of the heated stainless steel packing. A total of 8 grams of the urethane was added over a four minute period. The liquid reservoir at the air cooled condenser recovered (at room temperature) 5.70 grams of tolylene diisocyanate (TDI) for a recovery of 97.8 percent of the 5.84 grams theoretical yield (T.Y.). The dry ice-acetone trap recovered 2.1 grams of methanol. The infra-red spectrum of the TDI product showed the TDI to be about 99.2 percent pure, employing the 1740 $cm^{-1}$ carbonyl band for comparison against predetermined standards. The approximate contact time in the reactor was about 0.2 second on the basis of 20.5g of charge per minute per liter of free space.

The experiment was repeated using the bis-methyl urethane of 2,4-TDI (dimethyl 4-methyl-1,3-benzenedicarbamate). This run yielded essentially the same relative quantity of TDI with the same high purity.

EXAMPLE II

Using a similar equipment arrangement with, however, a 6 inch deep bed of the stainless steel packing providing 71 ml of free space equivalent, the temperature was controlled at 471°C, as measured by a thermocouple placed one-half inch from the bottom of the bed. This reactor was evacuated to 20 mm/Hg pressure and the same 10 ml (standard conditions) nitrogen flow was employed. Over a 5 minute period, 8 grams of the mixed 2,4- and 2,6- urethanes used in the first run of Example I were added cold to the packing in the pyrolysis zone. The product TDI amounted to 5.8 grams for a yield of 99.3 percent which from infra-red analysis was calculated to have a purity of 98.8 percent. The approximate contact time was 0.3 seconds based on a feed rate of 23.5g per liter of free space per minute.

This test was repeated without nitrogen flow (the apparatus was first evacuated with nitrogen flowing, then the nitrogen flow was stopped). This run yielded 5.7 grams of TDI of 98.7% purity. These results appeared to be essentially the same results as those obtained in the first run where the nitrogen sweep gas was employed.

EXAMPLE III

In the runs of this Example, the air cooled condenser was less efficient and some TDI carried over into the methanol trap.

In the first run, the packed bed was a 6 inch bed of copper wires providing the equivalent of 26 ml of free space and maintained in the range of 518°-527°C. Eight grams of the bismethyl urethane of minute-TDI was added over a 41 minute period. This run yielded 5.6 grams of TDI and 2.4 grams of methanol, the latter containing some TDI.

The second run substituted a six-inch bed of quartz for the packing and providing the equivalent of 33.6 ml free space. From a charge of 8 grams of the bis-methyl urethane of 2,4-TDI there was otained 5.5 grams of product in the TDI receiver and 2.5 grams in the methanol trap. Here too incomplete product separation was obtained.

The above described runs, along with the results obtained in Example I and II, demonstrate that the urethane dissociation was uncatalyzed since neither the copper wires nor the stainless steel Heli Pak nor the quartz packing affected the results.

EXAMPLE IV

A 9-inch bed of stainless steel packing was prepared in the glass tube described above with the equivalent of 97.5 ml free space and the system evacuated to 15 millimeters of mercury. The usual 10 milliliters/minute (standard) sweep gas nitrogen flow was employed. A total of 80 grams of the mixed methyl urethanes of TDI employed in Example I was added over a 66-minute period. The bed temperature was maintained at 412°C. The TDI product condensed out in an efficient glass spiral air cooled condenser amounted to 58.3 grams (T.Y. 58.4 grams). In addition, 21.6 grams of methanol (T.Y. 21.6 grams) were recovered in a dry-ice acetone condenser.

EXAMPLE V

A series of three runs was made using a 6 inch bed with 71 ml free space of the stainless steel packing with a thermocouple at the bottom of the bed. In all runs, the pressure was maintained at 40 millimeters of mercury and a 10 milliliter sweep of nitrogen was employed.

In the first run, 8 grams of the bis-ethyl urethane of 2,4-TDI was added over a 4 minute period to the top of the bed, the bed was temperature controlled at 510°C. There resulted 5.3 grams of TDI (T.Y. 5.4 grams) of 95 percent purity and 2.7 grams of ethanol.

This run was repeated, except that the contact time was to be increased by adding the urethane over a 6 minute period. However, after 3 minutes this run was discontinued because the product being recovered from the aircooled condenser was a thick vixcous liquid indicating that some sort of polymeric product was being formed.

The run was again repeated with the urethane added over a 6 minute period. However, in this third run, the bed temperature was maintained at 482°C. This time the run was completed. The products were 5.3 grams TDI of more than 95 percent purity and 2.5 grams of ethanol.

The several runs of this example indicate that temperature and contact time constitute interrelated variables for best results in conduct of dissociation of urethane. Loss of yield quality may be experienced if one variable is changed without corresponding change in the other variable.

EXAMPLE VI

In a series of runs using a similar equipment arrangement and packing in the pyrolysis zone as in EXAMPLE II with the temperature controlled at 412°C the effect on product yield was noted when the charge was melted and held at its melting point for various times before being charged to the reaction zone. A control with the same weight of charge at the same operating conditions except that the urethane was charged without intervening melting gave an isocyanate product yield of 98 percent of theory. When the charge was melted and held for 5 minutes before introduction to the pyrolysis zone the yield of isocyanate was about 85 percent of theory. Likewise when the molten state of the charge was maintained for 15 minutes prior to charging to the reactor the yield of isocyanate product was much less.

EXAMPLE VII

A run was made in a system similar to that in EXAMPLE VI charging solid bis-methyl urethane to the pyrolysis zone. The temperature of the reaction zone was maintained at 371°C, the charge was 8 grams introduced over 11 minutes, and the residence time was 4.4 seconds. At these relatively mild conditions the dissociation of the urethane charge was less than complete as evidenced by the presence of converted urethane in the condensed isocyanate product portion which amounted to about 90 percent of the theoretical yield.

What is claimed is:

1. In a process for thermally dissociating a urethane to products including the corresponding isocyanate, said urethane having the following formula:

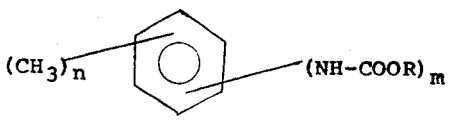

where $n$ is an integer from 0 to 2,
where $m$ is an integer from 1 to 3,
where R is methyl,
which comprises introducing the urethane into a non-catalytic pyrolysis zone maintained at a reaction temperature of the range of about 350°-550°C, and at a pressure less than ($m + 1$) times the vapor pressure of product isocyanate at the reaction temperature, removing vapor phase reaction products from said reaction zone cooling the reaction product vapors to condense out substantially all of the isocyanate therefrom while leaving at least 95 percent of the alcohol product in vapor form, the improvement wherein the urethane is introduced into the pyrolysis zone in solid particulate form and the residence time of the dissociation products in the pyrolysis zone is less than 1 second whereby a yield of at least 95 percent of theory isocyanate is prepared and recovered.

2. The process of claim 1 wherein said pressure is in the range of 4 to 105 millimeters of mercury.

3. The process of claim 1 wherein said reaction zone is maintained at a temperature within the range of abut 400°C - 530°C.

4. The process of claim 1 wherein the integer $n$ is 1 and the integer $m$ is 2.

5. The process of claim 1 wherein said urethane is dimethyl 4-methyl-1,3-benzenedicarbamate and the condensed isocyanate is tolylene diisocyanate.

* * * * *